United States Patent [19]

Thomson

[11] Patent Number: 5,016,190
[45] Date of Patent: May 14, 1991

[54] DEVELOPMENT OF RASTER SCAN IMAGES FROM INDEPENDENT CELLS OF IMAGED DATA

[75] Inventor: Christopher W. Thomson, Islington, Canada

[73] Assignee: Delphax Systems, Randolph, Mass.

[21] Appl. No.: 190,427

[22] Filed: May 5, 1988

[51] Int. Cl.⁵ .............................................. G06F 15/62
[52] U.S. Cl. ..................... 364/518; 364/519; 364/521
[58] Field of Search ....................... 364/518, 519, 521; 400/63, 76, 279

[56] References Cited

U.S. PATENT DOCUMENTS

| | | | |
|---|---|---|---|
| 3,952,852 | 4/1976 | Greek, Jr. et al. | 400/76 X |
| 4,007,442 | 2/1977 | Findley et al. | 400/63 X |
| 4,028,680 | 6/1977 | Vittorelli | 400/63 X |
| 4,148,066 | 4/1979 | Saylor | 364/519 |
| 4,205,922 | 6/1980 | Pascoe | 400/76 X |
| 4,207,011 | 6/1980 | Pascoe | 400/76 X |
| 4,212,553 | 7/1980 | Acosta et al. | 400/76 X |
| 4,642,790 | 2/1987 | Minshull et al. | 364/521 X |
| 4,648,045 | 3/1987 | Demetrescu | 364/521 X |
| 4,653,020 | 3/1987 | Cheselka et al. | 364/521 X |
| 4,841,453 | 6/1989 | Finlay et al. | 364/519 |

Primary Examiner—Dale M. Shaw
Assistant Examiner—Mark K. Zimmerman
Attorney, Agent, or Firm—Rogers & Scott

[57] ABSTRACT

A method and apparatus for converting data representative of a plurality of cells arranged independently of one another on a page into data is raster scan order for subsequent printing. Cell data for individual cells is fetched in an order dependent on the line of raster scan where the cell first occurs and the bit position for the first bit representing the cell. This cell data is compared with earlier fetched cells to build up raster scan lines from cells occuring in the lines.

1 Claim, 12 Drawing Sheets

CELL LIST

| MEMORY ADDRESS | POSITION BIT/LINE | SPECIFICATION HEIGHT/ADDRESS* | COMMENTS | CONTROL |
|---|---|---|---|---|
| 000000 | 2047 0 | 0 001000 | CELL 0 = END OF LINE (EOL) | MARKER, EOL |
| 000008 | 0 1 | 0 001000 | CELL 1 = START OF LINE (SOL) | MARKER |
| 000010 | 1023 12 | 14 002000 | CELL 2a = FIRST THIRD OF CELL 2 | — |
| 000018 | 1055 12 | 14 003000 | CELL 2b = 2ND THIRD OF CELL 2 | — |
| 000020 | 1087 12 | 14 004000 | CELL 2c = 3RD THIRD OF CELL 2 | — |
| 000028 | 959 18 | 17 005000 | CELL 3a = FIRST THIRD OF CELL 3 | — |
| 000030 | 991 18 | 17 006000 | CELL 3b = 2ND THIRD OF CELL 3 | — |
| 000038 | 1023 18 | 17 007000 | CELL 3c = 3RD THIRD OF CELL 3 | — |
| 000040 | 0 39 | 0 001000 | CELL 4 = LAST LINE | — |
| 000048 | 0 40 | 0 001000 | CELL 5 = END OF IMAGE | — |
| 000050 | 0 40 | 0 001000 | CELL 6 = STOP | STOP |

\* THIS IS THE ADDRESS IN CELL DATA MEMORY.

DEVELOPMENT OF RASTER SCAN IMAGES FROM INDEPENDENT CELLS OF IMAGED DATA

BACKGROUND OF THE INVENTION

This invention relates to a printer controller for organizing data from a host computer to print the data on a print engine, preferably of the type using charged transfer imaging, and more particularly to an image generator used in the printer controller.

Printer controllers which are designed to receive data from the host computer are commonly limited to locating cells relative to one another in a fixed manner dictated by each cell being located by reference to the cells around it. The cells can not be overlapped or start at the same location. Such limitations restrict the kind of text information that can be handled by the controller and printed as hard copy by a print engine. Such techniques as proportional spacing, kerning, superscripts, subscripts, and mixed point sizes of text may not be possible. The limitations on the locations of the cells may also restrict the locations of bit maps and text information. As a result the overlay of a bit map representing a business form with text information may not be possible.

SUMMARY OF THE INVENTION

The present invention provides methods and apparatus for handling cell data essentially independently of other cell data on a page so that the resulting printed representation of the page will have cells positioned independently of one another making it possible, for instance, to superimpose such combinations as forms and text in the page.

BRIEF DESCRIPTION OF THE DRAWINGS

The invention will be described with reference to the drawings in which:

FIG. 5, drawn beside FIG. 6, is a representation of a page of print resulting from the cell list of FIG. 4;

FIGS. 6 to 12 are further illustrations of the preparation of the page and using parts of the flow chart of FIG. 6.

DESCRIPTION OF THE PREFERRED EMBODIMENT

Figure 1:
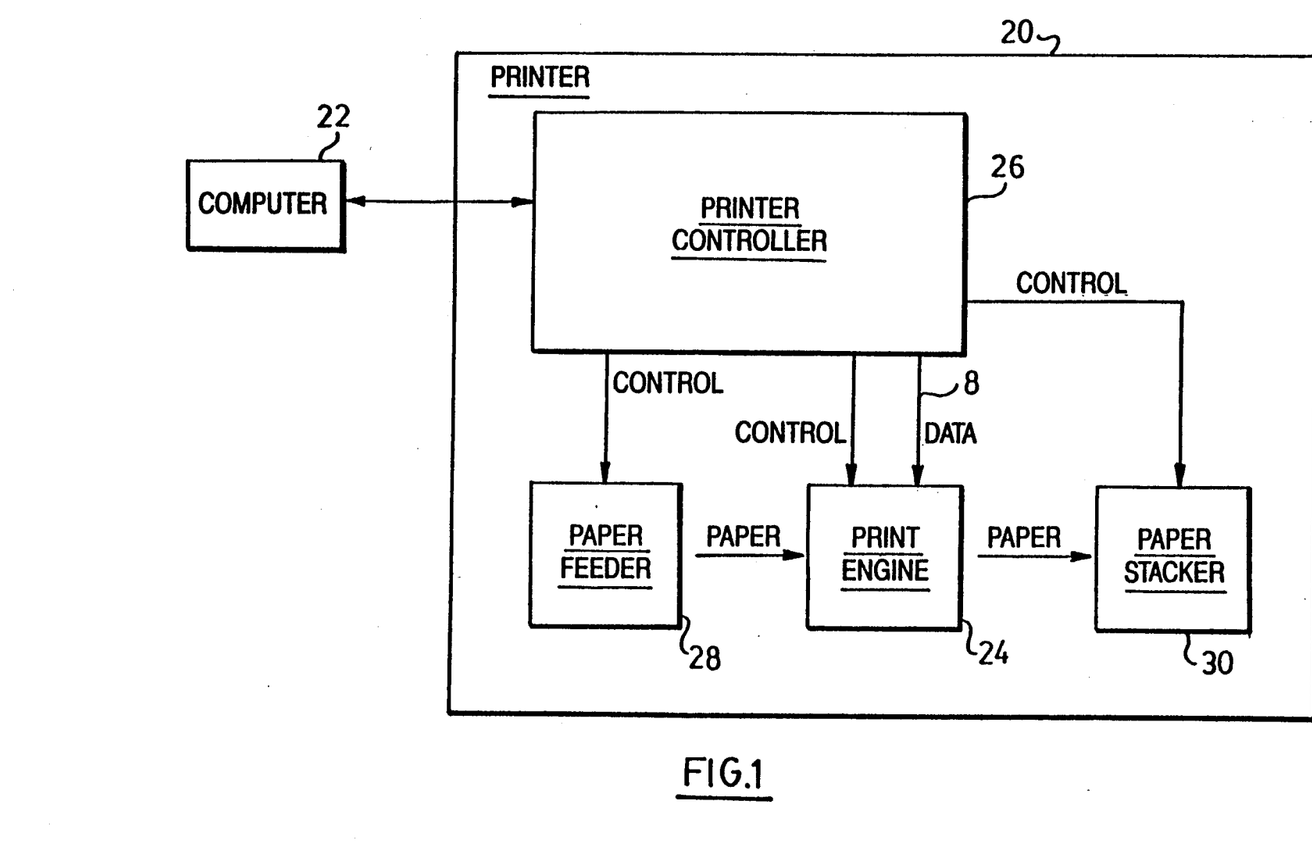
FIG. 1 is a schematic representation of a printer incorporating a printer controller according to the invention.

Reference is made firstly to FIG. 1 which illustrates a printer designated generally by the numeral 20 connected to a computer 22 to receive data from the computer for converting to a hard copy in a print engine 24 forming part of the printer. A printer controller 26 controls the operations of a paper feeder 28 providing paper for the print engine 24, and of a paper stacker 30 which receives the finished printed page.

Data from the computer represents images within individual cells which can be multiples of 32 bits (i.e. for the purposes of this description, two words) wide and have a height of from 1 to 256 lines. The position of an individual cell is represented with reference to the page by identifying the left top corner of the cell in terms of its bit position on a particular line and the number of the line on which it occurs. This will be described in more detail with reference to an example which is identified in FIG. 4.

Figure 2:
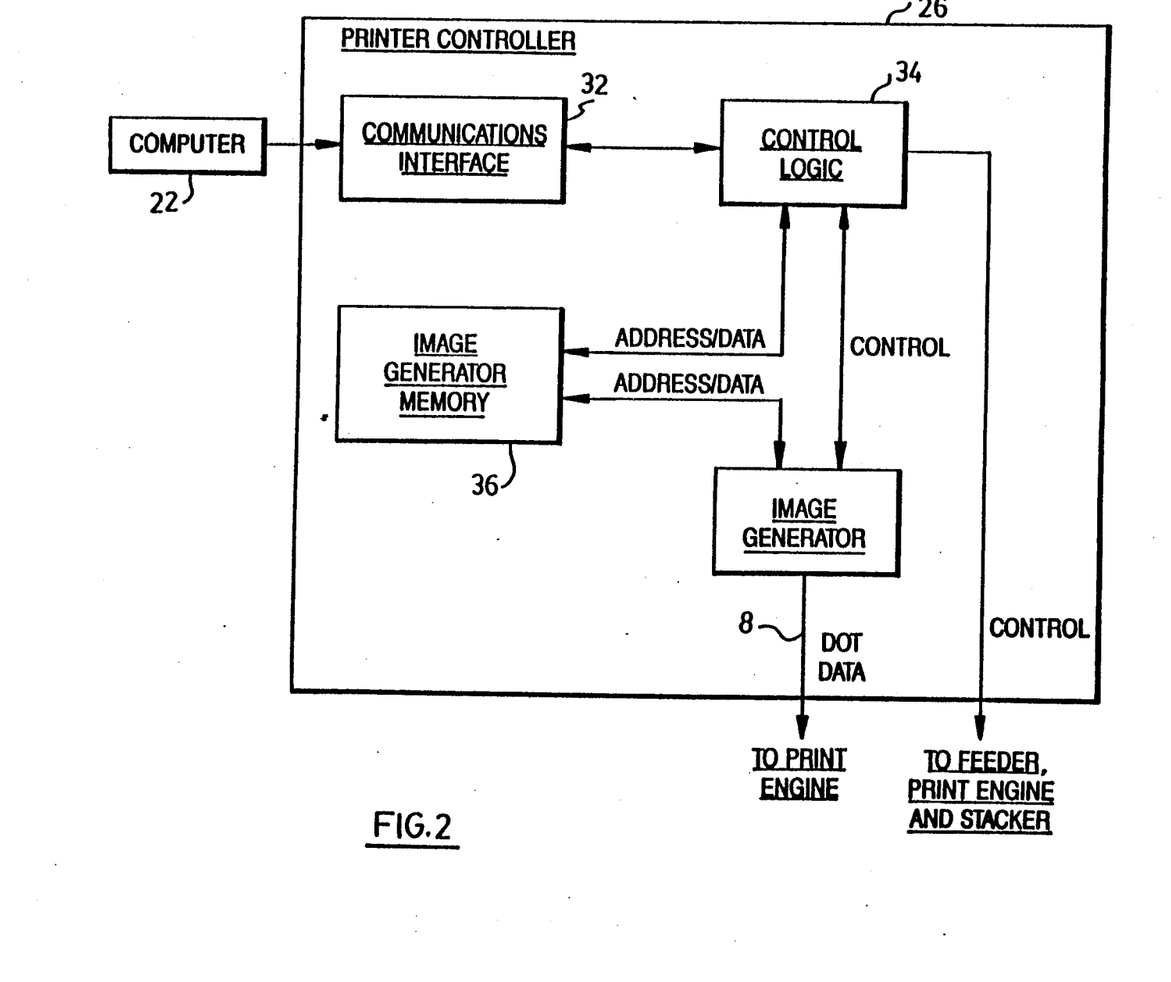
FIG. 2 is a diagrammatic representation of the printer controller incorporating an image generator.

The printer controller is better seen in FIG. 2 where it will be seen that the printer controller 26 interfaces with the computer 22 via a communications interface 32. This is facilitated by a control logic 34 which also controls an image generator memory 36 and image generator 38. Data leaves the printer controller in bytes of 8 bits which are fed to the print engine as indicated in FIG. 2 and shown in FIG. 1.

As will become apparent from subsequent description, cells to be printed are stored in the image generator memory in terms of their specification and position on the printed page using any suitable sorting procedure to position the data in memory. (Alternative memory arrangements can of course be used).

Also in the image generator memory is stored bit maps for individual cells to represent a selected font or other graphics data. The memory is in two parts, a cell list which defines the cell, and cell data, the address of which is included in the cell specification so that the data can be withdrawn to be fed to the print engine by the control logic and image generator.

The selection of cells and the order in which they are processed in the image generator will be described generally with reference to FIG. 3 and then an example of a particular page to illustrate the operation of the image generator will be described with reference to subsequent figures, the cell list for the page being shown in FIG. 4.

Figure 3:
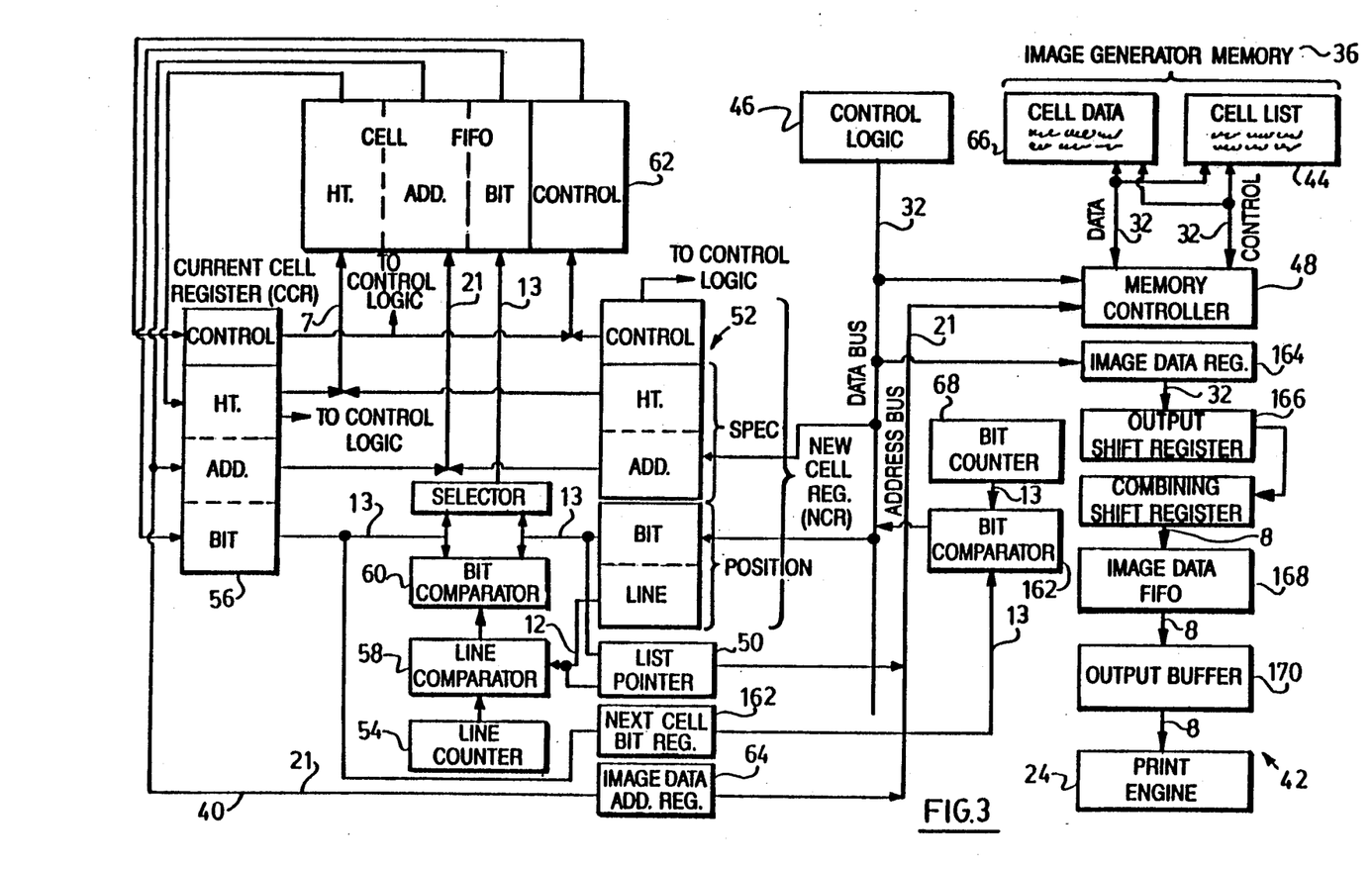
FIG. 3 is a diagrammatic representation of the image generator.

Reference is next made to FIG. 3 to describe in general terms the image generator 38. The operation of the generator and further explanation of it will be included in a description of the exemplary operation of the printer.

As seen in FIG. 3, the image generator is essentially in two parts, namely a cell sequencer 40 shown generally to the left of FIG. 3, and an image assembler 42 shown generally to the right of FIG. 3. The sequencer 40 is used to fetch cell data from a cell list 44 which is stored sequentially in the memory. This memory forms part of the image generator memory 36 and a processor 46 forms part of the control logic 34 (FIG. 2). A memory controller 48 is used for this purpose triggered by a list pointer 50 operated as will be described later. Essentially the cells are fetched from the cell list and positioned in a new cell register 52 in the order in which they are to be placed on the page of text. When the line number on which the cell first appears is reached by a line counter 54, the cell in the new cell register 52 is compared with a cell in a current cell register 56 and, depending upon which cell is to be printed first, that cell will, as a result of comparison in line comparator 58 and bit comparator 60, be selected for entry into a cell FIFO 62. The procedure is to cycle the cells through the FIFO and current cell register while increasing the line count and decreasing the number of lines left in the cell (the 'cell height') until that cell is exhausted. The line count continues and the cycling continues bringing in new cells via the new cell register until all of the cells have been accommodated and the page is completed. Each time a cell passes through a FIFO the address of data representing that part of the cell on the line being processed is passed to an image data address register 64 to activate fetching that data from a sequentially arranged cell data memory 66 which also forms part of the image generator memory 36. This data is then processed in the image assembler (as will be described subsequently) for output to the print mechanism as previously mentioned.

Figure 4:
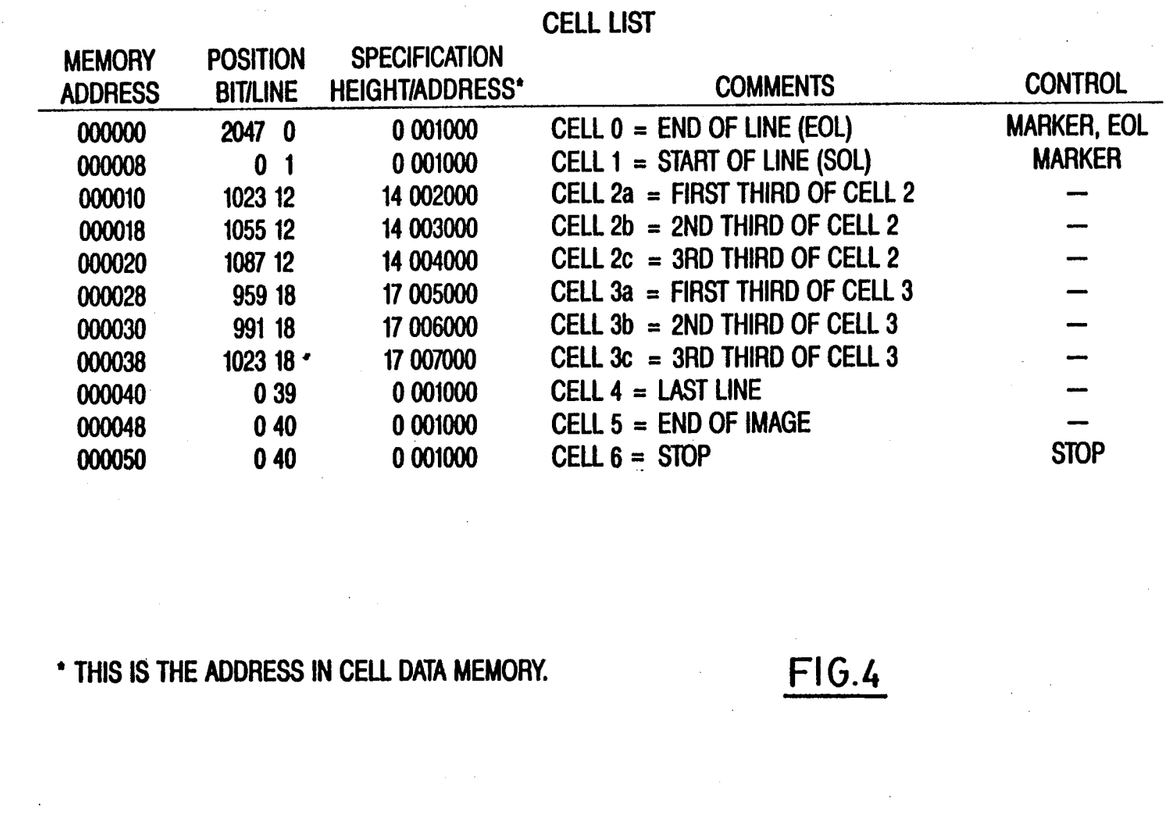
FIG. 4 is an exemplary cell list used to illustrate the operation of the image generator.

Reference is next made to FIG. 4 which shows an exemplary cell list for use in illustrating the operation of the image generator, and initially of the cell sequencer 40 (FIG. 3). It will be seen that the cells appear as 8 memory addresses (the addresses being hexadecimal). The memory is actually four 8-bit bytes wide so that for each cell two rows of the memory are used. The first cell listed is an end of line (EOL) cell which is identified as the last dot position (2047) on a line. The height of the cell is zero and its address in the cell data memory is 001000. This will be referred to as cell 0. The next cell is cell 1 which represents the start of a line (SOL) and that has a bit position of 0 with a line position of 1. The address is also at 001000 in the cell data memory because these represent similar output. To facilitate this, there must be sufficient zero data at 00100 so that the data fetched for cells 0 and 1 does not interfere with the image.

Cell 0 is located at the end of the raster scan line (dot position 2047 in this example) and has the EOL bit set. Cell 0 defines the length of the raster scan line. When the image data for this cell is loaded from the image data register into the combining shift register (as will be explained), the bit counter which counts bits in the raster scan is reset to 0 for a new scan line.

Cell 1 is required because only image data and the bit position for this data are sent to the image assembler 42. If only cell 0 were in 5462, the image assembler 42 would not output a raster scan line for each cycle of cell 0 through the cell FIFO. It would overlay each occurrence of cell 0.

Cell 0 and cell 1 have the marker bit set. This prevents the control logic from discarding cells 0 and 1 when their height is exhausted as will be explained. The height value for the cell therefore has no meaning and cell 0 and cell 1 never end until the scanning of the page is completed as will be explained.

The next cell is represented in FIG. 4 where it will be seen that cell 2 is in three parts. Cells can be multiples of 32 bits and this cell is represented by three 32 bit parts, namely 2a, 2b and 2c. These are best considered as dependent cells but it will be recognized that the three together represent a bit map for a character or graphic representation within the cell 2 as a whole.

Cell 3 is also made up of three parts and is positioned so that it overlaps with cell 2 as seen in FIG. 4. FIG. 4 represents the position of the cell on a page which is 2048 bits wide and 40 rows high. Cell 2 commences at bit 1023 on row 12 and is 14 rows high. Similarly, cell 3 commences at bit 959 on row 18 and is 17 rows high.

These cells are typical of overlapping cells. Of course the procedure will be similar whether the cells are overlapped or not. It will be clear from a description of how the sequencer organizes the data to represent these cells that the procedure would be usable for any arrangement of cells and any size of cells within the limitations of the definition of a cell, i.e. multiples of 32 bits wide and height of 1 to 256 rows. The definition is of course limited only by the arrangement of the image generator memory and the image assembler which operates with 32 bits at a time. If preferred to the minimum bit width of a cell could be 8,16 or any suitable number. The resolution will be enhanced with smaller bit widths but the speed of the procedure will be slower. 32 bits is an acceptable compromise.

Figures 5, 6A:
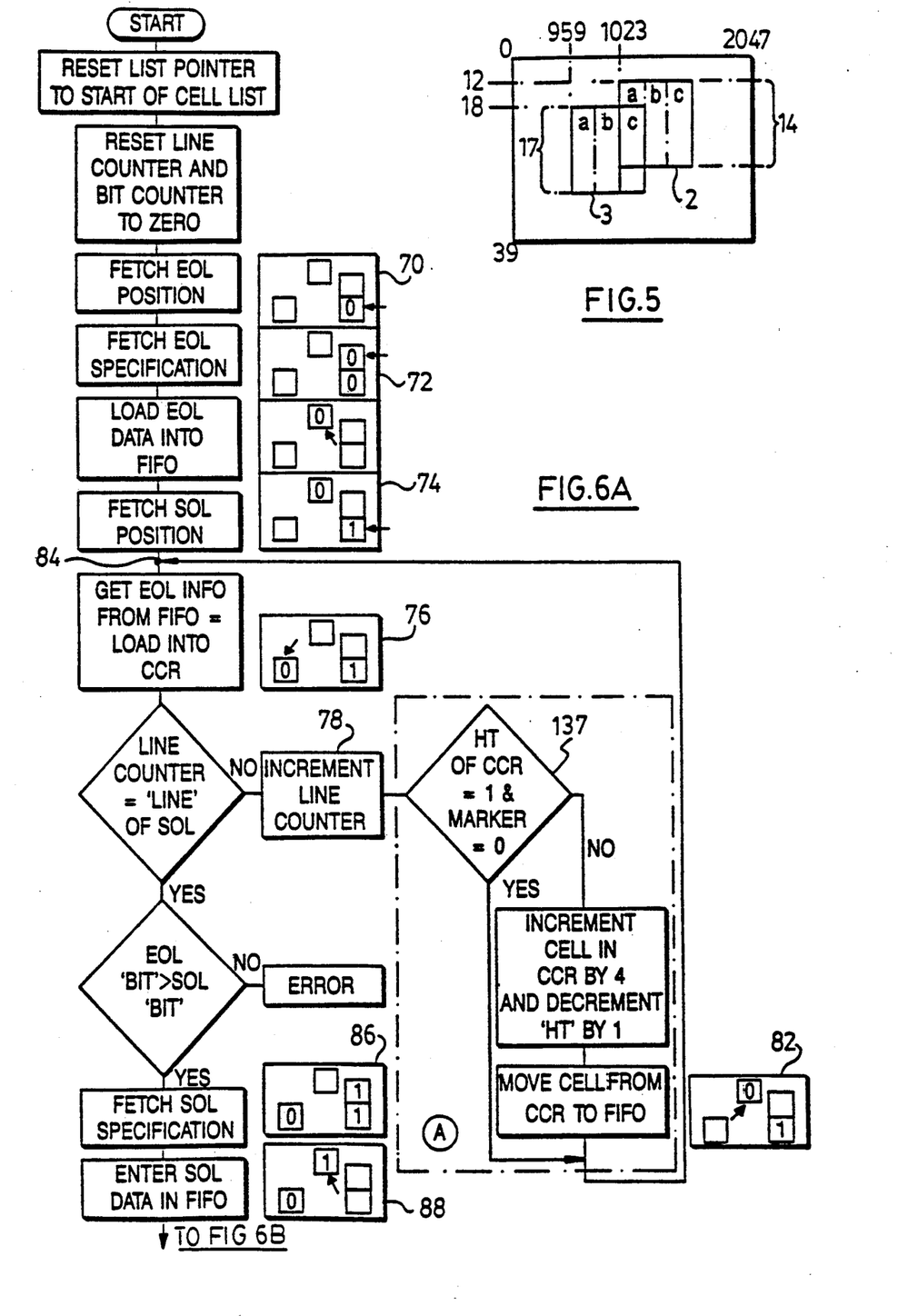
Figure 6B:
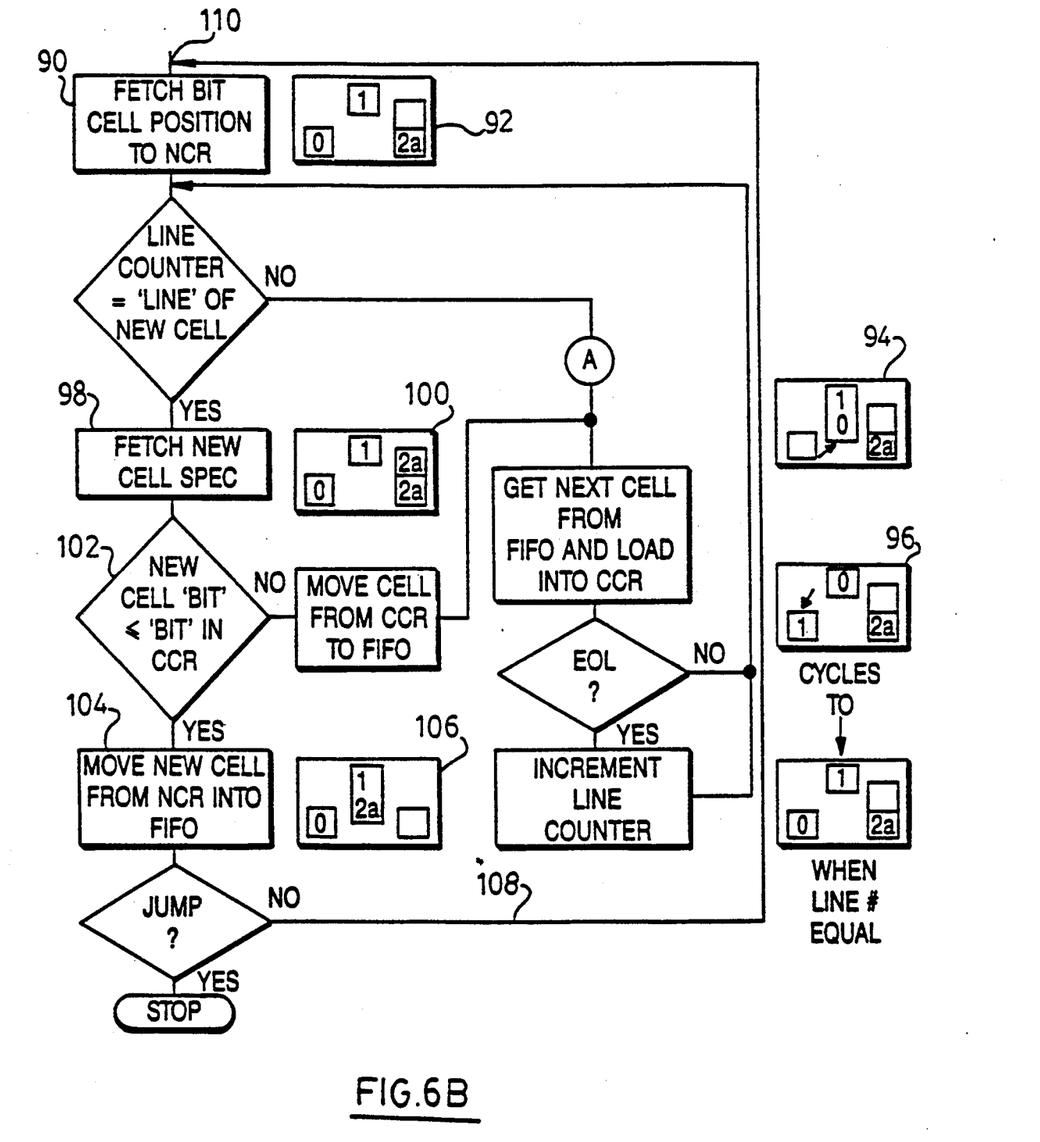
FIG. 6 is a flow chart illustrating the first steps of the operation of the image generator in preparing the page shown in FIG. 4.

Referring now to FIGS. 3 and 6, initially the cell list is loaded at 44 in the image generator memory and the line counter 54 and bit counter 68 shown in FIG. 3 are set to zero. The first cell is then fetched from the cell list 44 in terms of its position which is represented in the new cell register by bit and line. To demonstrate what is happening, schematic drawings of arrangements such as that indicated by numeral 70 are included in FIG. 6. 70 represents the three major parts of the cell sequencer 40. To the bottom right is the new cell register in two parts, i.e. the position at the bottom and the specification at the top; the center and top represents the FIFO contents 62, and the bottom left represents the current cell register 56 and its contents. It will therefore be seen at 70 that the position of cell 0 has been added to the new cell register and the FIFO and current cell register (CCR) are empty. Next the specification of cell 0 is fetched from the cell list 44 and entered as seen at 72. The data from cell 0 representing the height, address, and bit position are then moved into the FIFO. Next the position of cell 1 is fetched as shown at 74.

The next step after 74 is to get the EOL data from the FIFO and load it into the CCR as shown at 76. A decision is then made as to whether or not the line counter 54 matches the "line" of cell 1 (SOL). Since the line position of cell 1 is 1 (see FIG. 4) and the line counter was reset to 0, there is no match. Consequently, the answer to the test is "no". Next the line counter is incremented at 78 and the procedure moves into a section designated as "A". The height of the cell in the CCR (i.e. cell 0) is compared with 1 and the member list checked. If the height is equal to 1 and the bit is 0 then the cell in the CCR is discarded as will be described later. In this case the cell height is not 1 and the marker bit is set so the cell in the CCR is incremented by 4 addresses and the height is decremented by 1. However, since the height in this case is 0, the decrement will have no effect.

The increase in the address is used at the image data address register 64 as will be described. For the moment the order of operations around the sequencer will be described and then the effect of the address changes on the image data address register 64 and on the image assembler 42 will be described separately.

Next the cell in the CCR is moved to the FIFO so that the arrangement is now as shown at 82. There is then a loop back to a point indicated as 84 and the end of line (EOL) data is then retrieved from the FIFO and loaded into the CCR resulting again in the same position as 76. However, this time the line counter was incremented so consequently the answer to the test as to whether the line counter is equal to the line of the SOL will be "yes". Next there is a bit position test to determine whether the bit position of the end of line in the new cell register is greater than the bit position of the SOL in the CCR. If the answer were "no", there would be an error in this case. The answer in this situation is "yes". Next the specification of the SOL is fetched from memory resulting in the arrangement shown at 86 and subsequently the data for this cell is entered in the FIFO with an arrangement 88 resulting.

The procedure has now completed the entry of the start of line (SOL) and end of line (EOL) data and this data will now circulate between the FIFO and the CCR while other cells are processed in order to define the end of each raster scan and to increment the line number when the end of a raster scan occurs.

A subsequent part of the diagram shown in FIG. 6 is to process the cells 2 and 3 shown in FIG. 5 commencing with an operation 90 to fetch the next cell position to the NCR. This results in the arrangement shown at 92. A test is then conducted to determine whether the line counter is equal to the line number of cell 2. The answer is "no" because cell 2 occurs at line 12. Consequently lines up to line 11 will have to be passed before there is an answer of "yes" to this test. A loop is provided to enable the lines to cycle commencing with the procedure denoted "A" where the end of line cell is moved from the CCR to the FIFO resulting in arrangement 94. After this the next cell from the FIFO, cell 1, is moved to the CCR as at 96 and the procedure in this loop will continue cycling in the FIFO and the CCR until the line number equals 12. At this point, after the cycle, the line count test is done with the answer being "yes" so that the next operation 98 takes place. This operation fetches the specification for cell 2a resulting in arrangement 100.

The procedure is now operating at line 12 (See FIG. 5) and consequently cell 2a must be put into the FIFO. In order to ascertain that this must happen, a test is done to compare the first bit of 2a, i.e. bit 1023 on line 12, with the bit of the EOL, i.e. bit 2047. The test is done at 102 and because the bit of 2a passes the test of being smaller or equal to the bit of the cell in the CCR, i.e. cell 0, then the operation 104 takes place to move this new cell 2a into the FIFO resulting in arrangement 106. There is then a loop 108 because the question of whether it is a jump is answered "no". The purpose of the jump will be described later.

Figure 7:
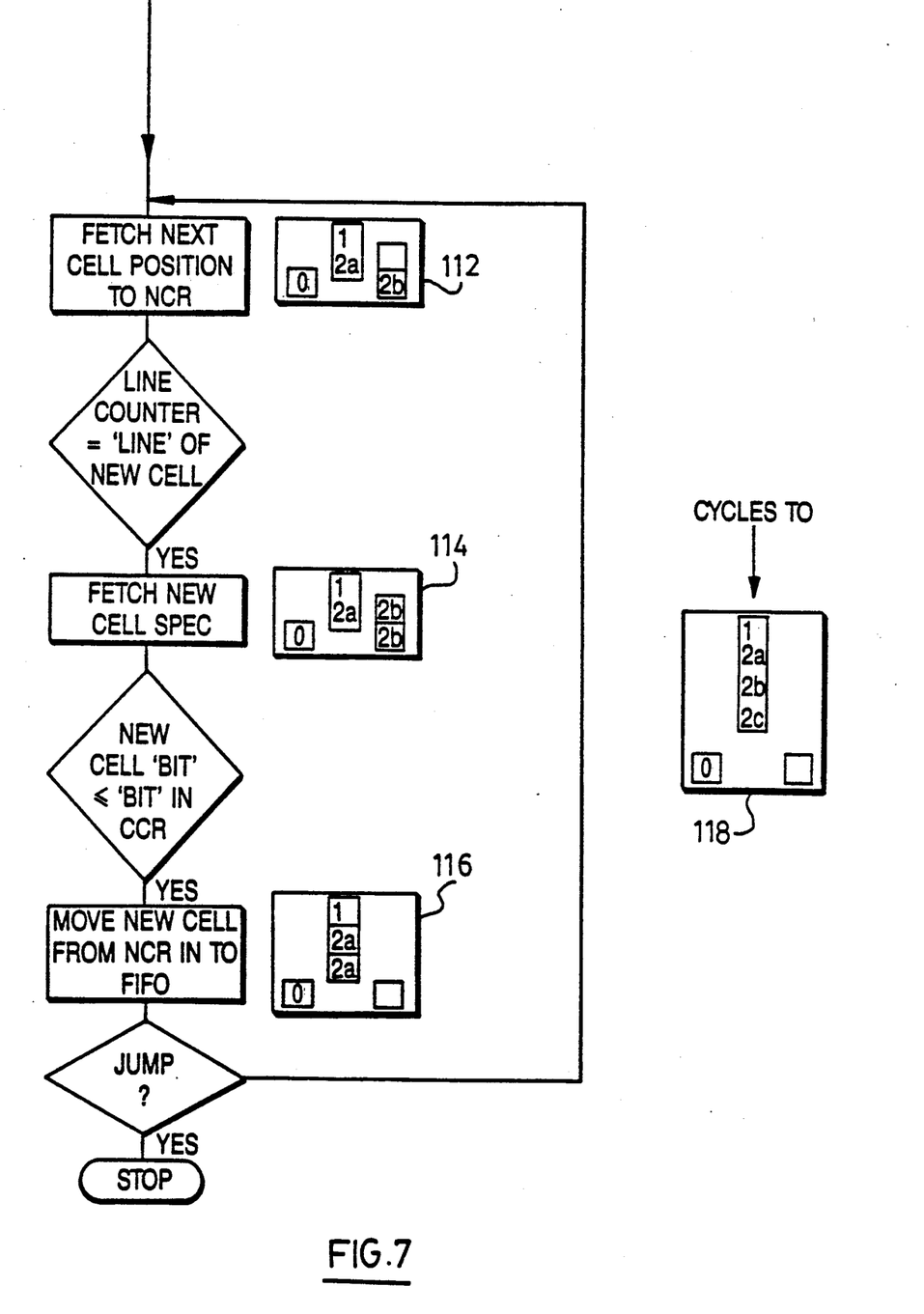

After looping back to position 110, the procedure follows the arrangement shown in FIG. 7. This figure is a repetition of the lower part of FIG. 6 and shows only the part of the circuit used in the next steps.

As seen in FIG. 7, the position of cell 2b has been fetched resulting in arrangement 112. The line counter has not changed so the new cell spec. is fetched as shown by arrangement 114. The new cell bit is less than the bit of the cell in the CCR, i.e. cell 0, so that the new cell is moved into the FIFO with the arrangement 116 resulting. The procedure loops back and repeats to bring in cell 2c in a similar fashion resulting in the arrangement 118 shown to the right of FIG. 7. Here it will be seen that while this looping has taken place, there has been no increase in the line number because cell 0 which controls this operation has remained in the CCR during the looping process.

Figure 8:
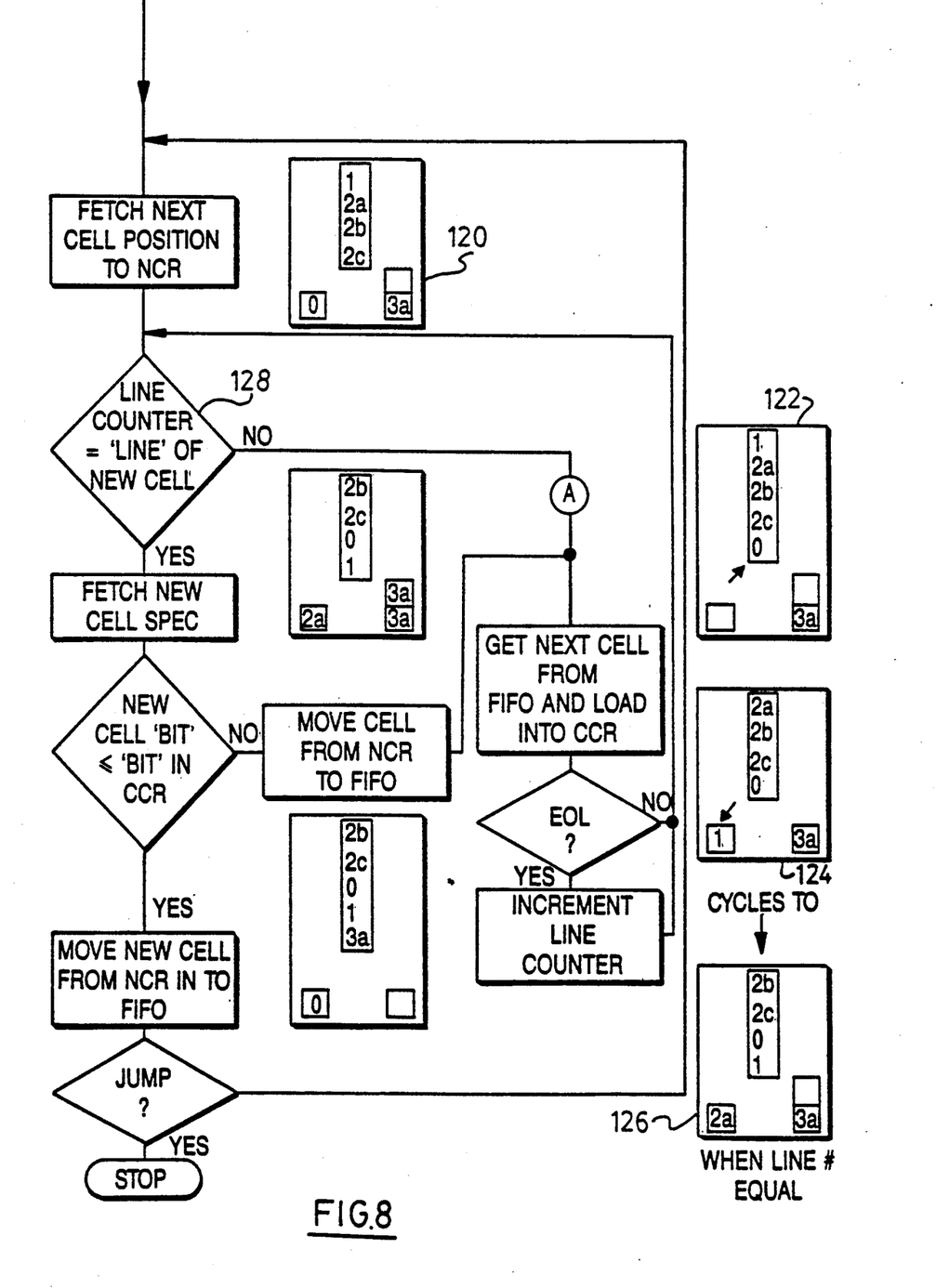

We now move to FIG. 8 which is again a repetition of the lower part of FIG. 6 and illustrates the next steps in the procedure following those in FIG. 7. Starting at the top, the next cell position is fetched from memory to create the arrangement 120. By reference to FIG. 5, it will be seen that this cell starts on line 18 at a bit position 959. Consequently, it will have no effect on lines 12 through 17 so that when the line position is compared, there will be no activity with cell 3a until line 18 is reached. This is illustrated in FIG. 8 where the procedure is similar to that shown in FIG. 6. The loop including procedure "a" is used so that initially within this procedure the cell 0 is moved to the FIFO and subsequently cell 1 is moved from the FIFO to the CCR and the procedure recycles. This will continue until line 18. At this point cell 2a is in the CCR with the line counter at 18 and the position of 3a in the new cell register (NCR). The line number for 3a matches the line count and this ends the looping resulting in an answer "yes" at the test for line counter 128.

Figure 9:
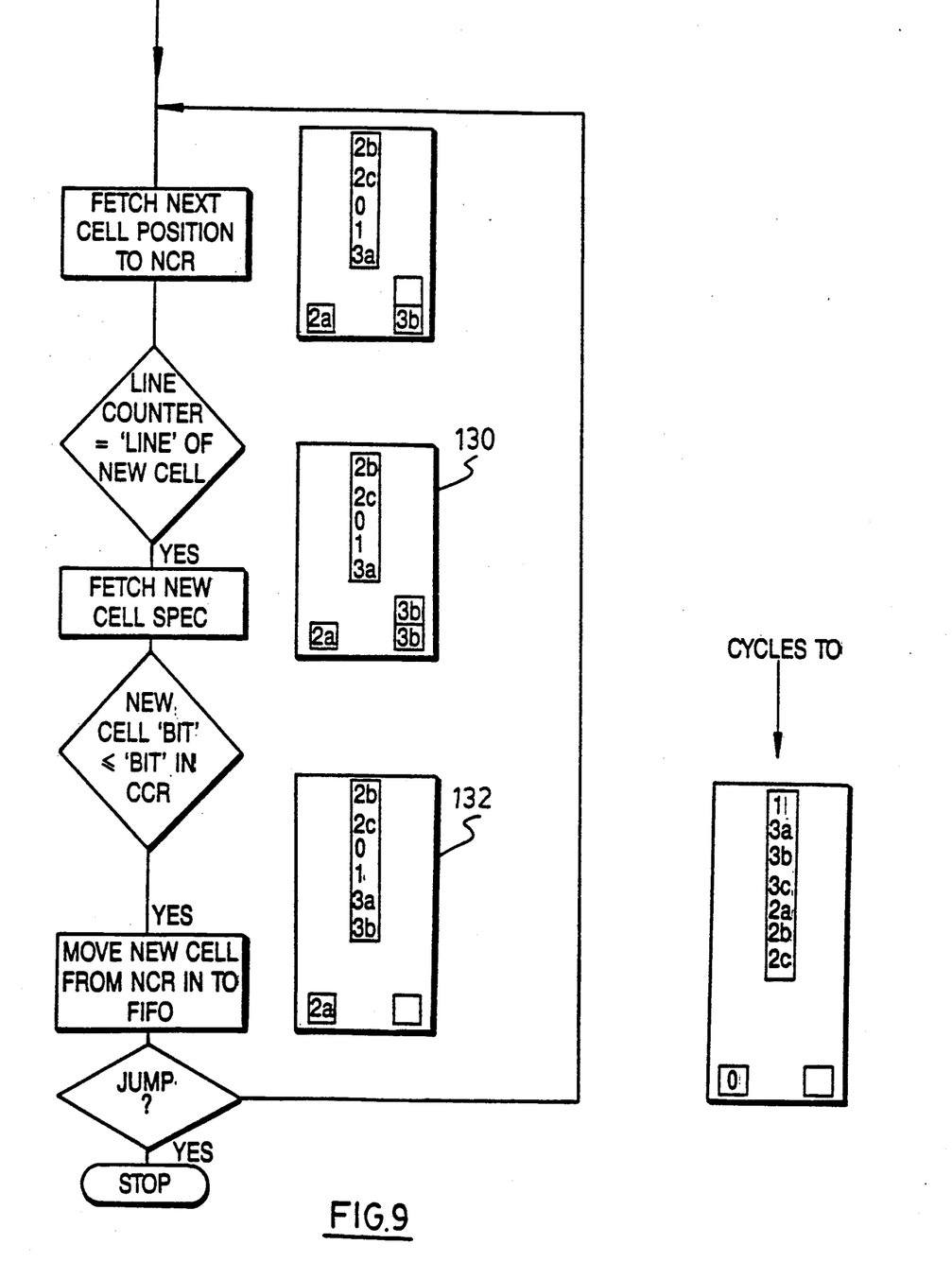

The next steps in the procedure are shown in FIG. 9. This will be seen to be similar to FIG. 7 and uses the same loop. Initially the next cell position, cell 3b, is fetched to the NCR and then the cell spec. is fetched resulting in the arrangement shown at 130. After this, and because cell 3b has a bit position of 991 (see FIG. 4) this cell must be entered ahead of cell 2a which has a position of 1023. This results in the arrangement shown at 132. The looping then takes place to bring in cell 3b which also will be entered ahead of 2a and then, because 3c has the same bit position as 2a it will also be entered ahead. The result after this cycling is completed is the arrangement shown at 134 drawn to the right of FIG. 9.

Figure 10:
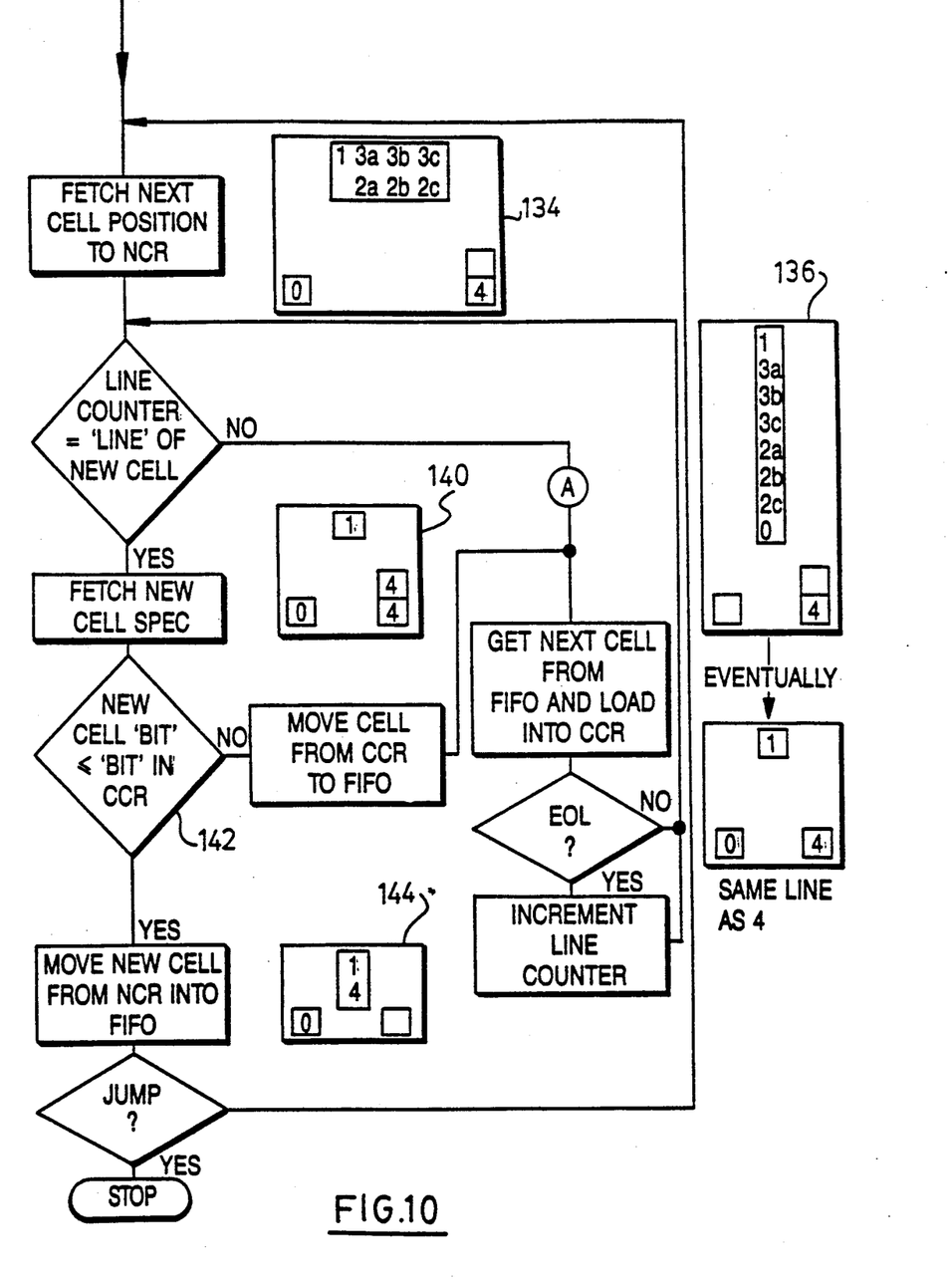

The cycling will now cease and the steps illustrated in FIG. 10 will take place. Initially the new cell 4 will be introduced. This cell has the function of simply ensuring that the last line, i.e. line 40 is completed before the end of the procedure. Cell 4 has the effect of ensuring that cell 0 triggers the transfer from line 39 to 40 and completes line 40 before the procedure ends. As seen in FIG. 4 cell 4 has a line position of 39. Consequently cells 2 and 3 will be exhausted long before cell 4 is reached and it is this exhaustion that will be addressed next.

As seen in FIG. 10, cell 4 is first fetched, resulting in the arrangement shown at 134 and the line counter test will result in "no". We are currently on line 18 and procedure "A" will cause cell 0 to move into the FIFO as illustrated at 136 and then the next cell is taken from the FIFO and loaded into the CCR to be compared with cell 4. This arrangement is not drawn because the similarity between FIG. 6 and FIG. 10 will illustrate this. The looping will continue and each time cell 0 passes around the loop the line counter will be incremented. Also, each time one of the cells is resident in the CCR the line count will be decremented by one and the address incremented by four addresses. This decrementing of the line will keep track of how much of the cell has been passed for processing in the image assembler. By reference to FIG. 5 it will be clear that after line 26 has been completed, then cell 2 must be discarded.

Referring to FIG. 6, it will be seen that the procedure "A" includes a discard when the height of a cell in the CCR is equal to 1 and the marker bit is 0. Consequently, in the looping shown in FIG. 10, when the procedure "A" is met by a cell having a height 1 and a marker bit 0, this cell is not moved to the FIFO but simply ignored. The next cell entering the CCR writes over the cell which has been discarded and is then tested itself. Initially all three cells 2a, 2b, and 2c will be discarded in this way at line 26 resulting in the loop continuing only with cells 3a, 3b, and 3c until line 35 is reached when these cells will also be discarded. At this point the looping will continue with cells 0 and 1 between the FIFO and the CCR while the position of cell 4 remains resident in the NCR. Eventually line 39 will be reached at which point the test of line counter equality at 138 will give the answer "yes". The new cell spec. is then fetched and the arrangement will be as shown at 140. The bit position of 4 is less than the end of line cell 0 so that the answer "yes" from the test 142 will result in the new cell moving into the FIFO creating the arrangement 144. This is then looped back and FIG. 11 comes into play.

Figure 11:
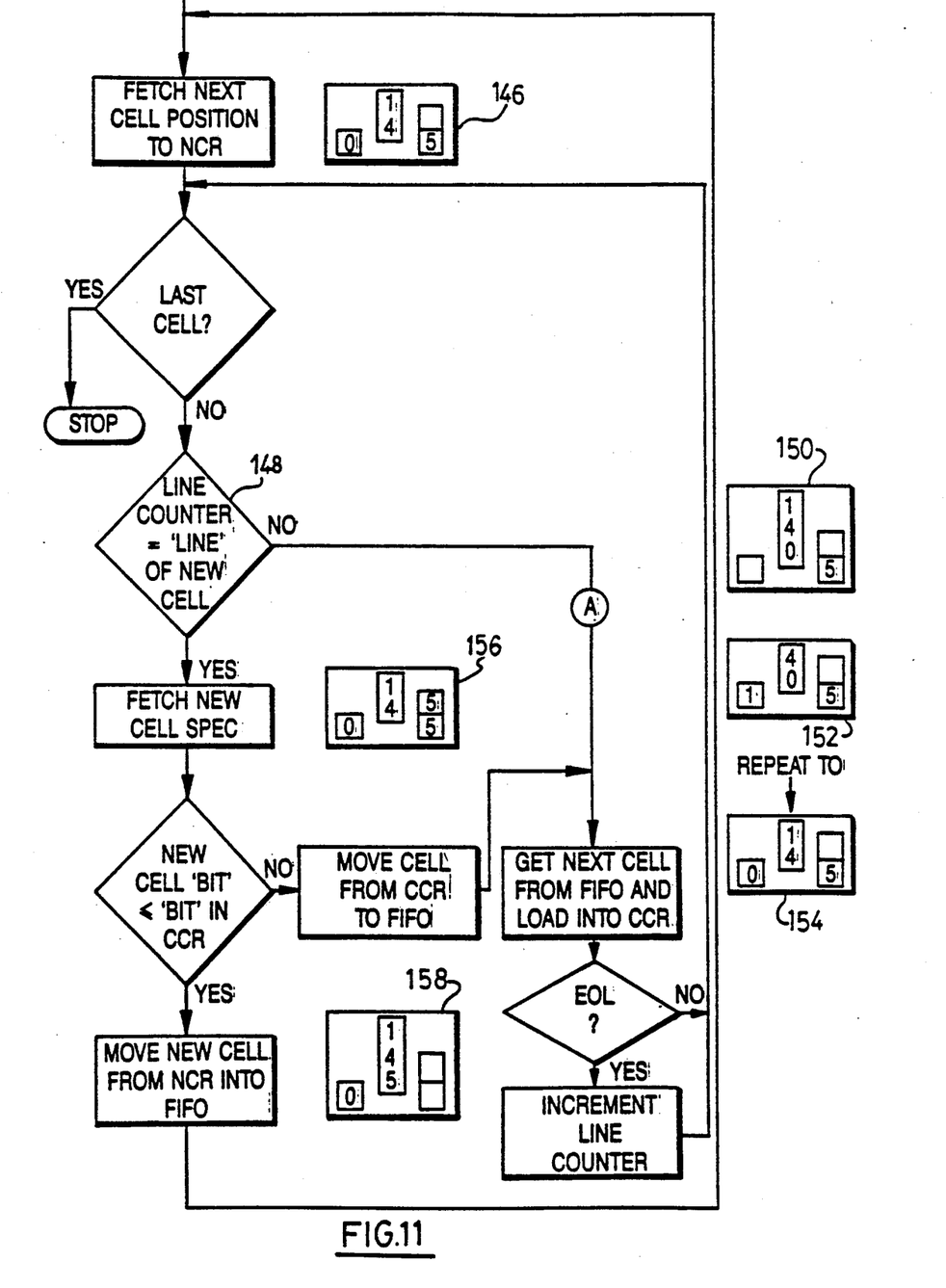
FIG. 11 is a flow chart showing the operation of the part of the image generator which organizes the data from memory in bytes, of 8 bits and in raster scan order.

As seen in FIG. 11, the position of cell 5 is fetched to the NCR creating arrangement 146. The STOP control bit is checked next. In this case the bit is not set, meaning there are more cells to come. Because cell 5 is on line 40 and the cell counter is at 39, the test at 148 will result in "no" bringing into play the loop containing "A" which creates the arrangement 150, and 152 before looping back. The loop will continue until the arrangement shown at 154 is created at which point the line counter moves to 40 so that 148 will give a "yes" answer. The new cell spec. is then fetched to create the arrangement 156 and then data for cell 5 is moved into the FIFO with the resultant arrangement 158. The cell position of cell 6 is fetched and loaded into the NCR. The STOP control bit is set for cell 6. This is detected by the control logic during the next loop back which stops output of the image.

Returning to FIG. 3, it will now be evident that when a cell moves from the FIFO to the current cell register, the address carried by that data is passed to the image data address register 64. This is an address in the cell data memory of 32 bits of information to be added to the raster scan at a bit position designated by the bit information from the same cell. The bit information is loaded from the CCR into the next cell bit register 162. The bit position held in the next cell bit register is for the image data held in the image data register, this data having been fetched from the image generator memory at the address held in the image data address register 64.

This bit information is passed to a comparator 162 which compares that bit position with the bit count of 68. So long as the bit position and the bit count are not equal, the control logic causes the data in the combining shift register to be shifted into the output shift register. When the bit position and the bit count are equal, the control logic causes the data from the image data register 164 to be OR'd with the data in the combining shift register 166. Serial data from this register represents a combination of the raster scan and the image data and is passed serially to a output shift register which has an 8-bit parallel output. Each 8 bits shifted into the output shift register is loaded as one byte into a FIFO 168 and then to an output buffer 170 from which the data passes in 8-bit bytes to the print engine 24.

Figure 12:
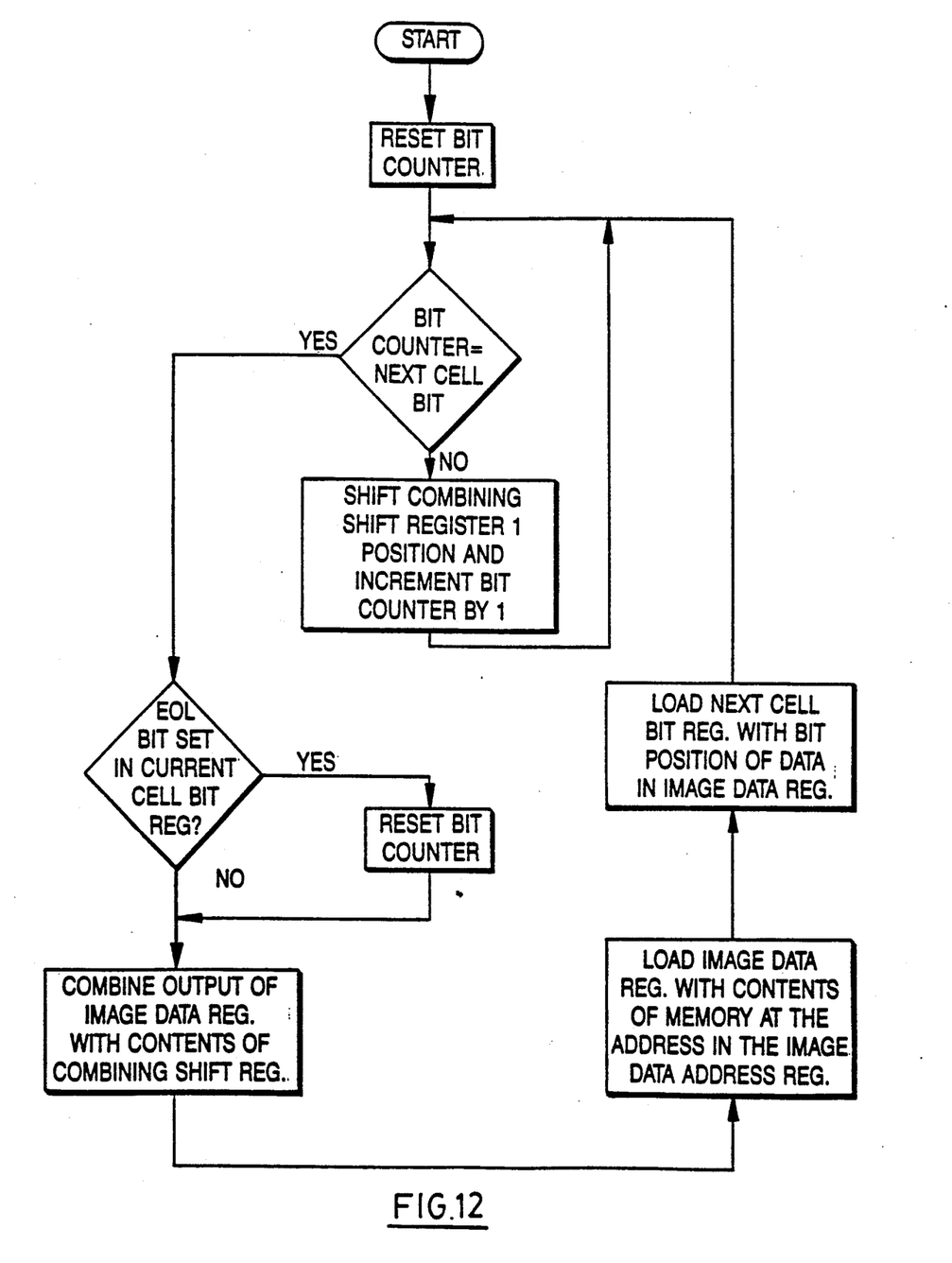

The operation of the image assembler 42 is illustrated in a flow chart shown in FIG. 12. The image assembler will be described with reference to FIGS. 3 and 12. Initially the bit counter 68 is reset and a test conducted to determine whether the bit counter is equal to the next cell bit in the register 162. If the answer is "no", the combining shift register is shifted one position by the control logic and the bit counter 68 is incremented by 1, also by the control logic. The test is conducted again to determine whether the bit counter is equal to the next cell bit and this loop continues until the answer is "yes". At this point a test is conducted to see whether the EOL bit is set in the current cell register (CCR) and if this the case, then clearly the bit counter must reset to start a new line in the "yes" loop. In the case where the current cell register does not hold the EOL bit, the answer will be "no" and the output of the image data register 64 is combined with the contents of the combining shift register 166. In other words, 32 bits of data are shifted from the image data register 164 into the combining shift register which holds 32 bits accumulated by the control logic one bit at a time. The data which has been combined in the combining shift register is now shifted into the output shift register serially and from there into the image data FIFO in 8-bit bytes. Next the data is shifted into the output buffer for output to the print engine. At this point there is a JUMP to escape after all of the data has been output.

If there is more data for output, the address in the image data register 64 is used by the control logic to fetch corresponding image data from the address in the cell data memory to the image data register 164. The next cell bit register 162 is loaded with the bit position of the same data and the data will remain in the image data register 164 until the bit comparator 162 instructs the control logic that the bit counter has reached the next cell bit contained in the register 162. This will cause the flow chart to loop and the procedure to be completed.

It is to be noted that should cells be written one over the other such as cells 2A and 3C shown in FIG. 5, then the common bits of these two cells will be moved through the image data register and written over one another in the combining shift register before the bit counter moves to the next bit. This ensures that should there be several cells super imposed at the same bit, the data for these cells will move through the flow chart before the control logic moves the bit counter 68 to the next bit.

Data leaving the combining shift register 166 serially is entered serially into an output shift register from which it is moved in 8-bit bytes to an image data FIFO 168 and subsequently to an output buffer 170 before being shifted to the print engine 24.

The circuitry described in the above description can of course be varied within the scope of the invention. The cell list is stored in sequential memory locations in the example given but this restriction can be removed by defining a JUMP command. This command is used in a cell list to continue the cell list at an arbitrary address and the JUMP command is loaded into the new cell register 52 in the same way as the cell specification. A control bit is tested by the control logic and if the contents of the NCR is a JUMP, then the address contained in the JUMP command is loaded into the list pointer 50 and a new cell specification is fetched.

Similarly, if a logical cell is wider than 32 bits, multiple cells can be entered in the cell list and the cell data divided up into 32 bit wide strips corresponding to the multiple cells. To eliminate this division of the cell data, control bits in the cell specification can be defined to specify how many 32 bit strips are required for the logical cell. These control bits would cause the current cell register to register to increment the image data address by an appropriate amount at the next image data for the strip. As an example, a 96 bit wide character requires 3×32 bit strips and the image data address for the 3 cells in the cell list would be incremented by 12 rather than the normal 4 in the example given.

It is also to be noted that the widths of the image data register and the combining shift register in the example given are the same as the image generator memory. To accommodate wider cells, the image data register and combining shift register can be wider by multiples of the image generator memory width. The image data register would be loaded by multiple accesses to the image generator memory.

Such modifications are within the scope of the invention as claimed.

I claim:

1. Apparatus for organizing digital data received from a source such as a host computer into raster scan order, the apparatus comprising:

(a) a cell data memory for storing all data representing attributes of a cell namely,
  (i) a number of a starting raster scan in which the cell first occurs,
  (ii) a bit location of a first bit in the starting raster scan,
  (iii) a number of the raster scan lines in the cell, and
  (iv) an address of data representing a portion of the cell in the starting raster scan and commencing at said bit location;

(b) a cell list memory for storing data representing each of said number of raster scan lines for said cell, the data representing the starting raster scan being located at said address;

(c) a new cell register for receiving and storing said cell data prior to the raster scan reaching said starting raster scan;

(d) a current cell register for receiving and temporarily storing said attributes (a)(ii), (a)(iii) and (a)(iv) of said cell;

(e) data comparison means for comparing attributes (a)(ii), (a)(iii) and (a)(iv) of said cell in the new cell register with the corresponding attributes of a previous cell stored in the current cell register, the comparison means including adjustment means for decrementing attributes (a)(iii) and (a)(iv) to the data for the next raster scan line of said cell;

(f) a FIFO for selectively receiving data representing attributes (a)(ii), (a)(iii) and (a)(iv) from either said new cell register or said current cell register;

(g) a line counter actuated after each raster scan to increment to the next raster scan;

(h) line comparison means for comparing the line number from the line counter with attribute (a)(i) to determine whether said data comparison means should be actuated, the line comparison means operating when the raster scan line number matches attribute (a)(i) to determine which of attribute (a)(ii) of the cell in the new cell register and the previous cell in the current cell register takes priority in the raster scan and causing the attributes (a)(ii), (a)(iii) and (a)(iv) of the cell data so selected to pass to the FIFO so that data is received in the FIFO in the order in which the data representing a series of cells is to be added to the raster scan; and (i) image assembler means for receiving attributes (a)(ii) and (a)(iv) in sequence as attribute (a)(iv) is decremented by the data comparison means, retrieving corresponding data from the cell list memory and assembling the corresponding data into the raster scan.

* * * * *